US006649870B1

(12) United States Patent
Barton et al.

(10) Patent No.: US 6,649,870 B1
(45) Date of Patent: Nov. 18, 2003

(54) SYSTEM AND METHOD FACILITATING FILLET WELD PERFORMANCE

(75) Inventors: David J. Barton, Twinsburg, OH (US); George Daryl Blankenship, Chardon, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 20 days.

(21) Appl. No.: 09/944,888

(22) Filed: Aug. 31, 2001

(51) Int. Cl.[7] ................................................ B23K 9/00
(52) U.S. Cl. .................... 219/137 R; 219/74; 219/146.1
(58) Field of Search ........................ 219/130.5, 137 PS, 219/137 R, 137 WM, 72, 74, 75, 146.1

(56) References Cited

U.S. PATENT DOCUMENTS

| | | | |
|---|---|---|---|
| 3,246,116 A | * | 4/1966 | Anderson et al. ........ 219/137 R |
| 3,496,323 A | * | 2/1970 | Lesnewich et al. ............ 219/74 |
| 4,058,700 A | | 11/1977 | Ito et al. .................. 219/137 R |
| 4,097,716 A | | 6/1978 | Reichelt, Jr. et al. ... 219/137 R |
| 4,162,389 A | | 7/1979 | Shimdada et al. ....... 219/121 P |
| 4,782,206 A | | 11/1988 | Ayres et al. ............. 219/76.14 |
| 4,825,038 A | * | 4/1989 | Smartt et al. .......... 219/137 PS |
| 6,093,906 A | * | 7/2000 | Nicholson et al. ...... 219/137 PS |
| 6,096,994 A | * | 8/2000 | Handa et al. ............ 219/130.5 |
| 6,476,354 B1 | * | 11/2002 | Jank et al. ................ 219/130.5 |

FOREIGN PATENT DOCUMENTS

| | | | | |
|---|---|---|---|---|
| EP | 0022736 | * | 1/1981 | ................... 219/74 |
| SU | 1657322 | * | 6/1991 | ................... 219/72 |

OTHER PUBLICATIONS

International Search Report, Dated: Dec. 11, 2002 International Application No. PCT/US02/27765.

* cited by examiner

*Primary Examiner*—Clifford C. Shaw
(74) *Attorney, Agent, or Firm*—Amin & Turocy, LLP

(57) ABSTRACT

The present invention provides a welding system and methodology to facilitate an improved fillet weld. The system includes an arc welding subsystem providing a fillet weld that joins one or more members. The arc welding subsystem controls one or more welding parameters and utilizes one or more controlled process variables, to facilitate geometric control of a toe angle, a toe radius, a throat dimension and a penetration depth associated with the joining of the fillet weld and the one or more members. The present invention also includes optimized welding parameters, welding wire alloys, and welding gas mixtures to promote an improved fillet weld.

40 Claims, 9 Drawing Sheets

| AWS CLASSIFICATION | CARBON | MANGANESE | SILICON | COPPER |
|---|---|---|---|---|
| ER70S-3 | 0.06-0.15 | 0.90-1.40 | 0.45-0.75 | 0.5 |
| ER70S-4 | 0.07-0.15 | 1.00-1.50 | 0.65-0.85 | 0.5 |
| ER70S-6 | 0.06-0.15 | 1.40-1.85 | 0.80-1.15 | 0.5 |
| ER70S-7 | 0.07-0.15 | 1.50-2.00 | 0.50-0.80 | 0.5 |

Note: Include Sulfur in the range of about 0.012% to about 0.025%

Fig. 7

SYSTEM AND METHOD FACILITATING FILLET WELD PERFORMANCE

TECHNICAL FIELD

The present invention relates generally to welding systems and materials, and more particularly to a system and method to facilitate fillet weld performance in gas metal arc welding systems by controlling a toe angle, toe radius, and penetration depth of the weld.

BACKGROUND OF THE INVENTION

Welding systems reside at the core of the modem industrial age. From massive automobile assembly operations to automated manufacturing environments, these systems facilitate joining in ever more complicated manufacturing operations. One such example of a welding system includes a gas metal arc welding system (GMAW). This may involve movement of a consumable electrode, for example, toward a work piece while current is passed through the electrode and across an arc developed between the electrode and the work piece, wherein portions of the electrode may be melted and deposited on the work piece. Other aspects of the welding system relate to control of power and waveforms supplied to the electrode, movements or travel of a welding tip during welding, electrode travel to other welding points, gas control to protect a molten weld pool from oxidation at elevated temperatures and to provide ionized plasma for an arc, for example, and control of arc stability to control the quality of the weld.

Several other factors influence the quality, stability, and performance of the weld, wherein subsequent processing to improve these factors can significantly impact the cost of a joining operation. As an example, non-load carrying fillet welds are often employed to join a non-load carrying structural member to a second structural member that are often joined at right angles between the members. Some of the factors that contribute to the fillet weld quality include a toe angle and toe radius that are defined at the junction of the toe of the weld and the member, along with a throat dimension and penetration depth defining how much of the weld overlaps and subsequently penetrates the material of the members. For example, many high-performance conventional welds provide a toe radius of about one millimeter or less. Unfortunately, weld fatigue failures usually occur at the weld toe on the non-load carrying member. These fatigue failures can be caused by a sudden geometry change between the member and weld toe intrusions, for example. Fatigue life of the weld can be compromised by the weld toe intrusions in addition to sharp notch effects that may appear in conventional welds. This can include such imperfections as undercut, slag entrapment, and/or other discontinuities in the weld.

In order to improve fillet weld quality, many conventional welding systems and processes utilize post-weld techniques that can mitigate some of the problems described above. These processes can include weld toe grinding, plasma dressing, hammer peening, shot peening, bur grinding, water-jet processing, disc grinding and/or combinations thereof to attempt to mitigate intrusions or other imperfections and ultimately improve the fatigue life of the weld. Manufacturers that rely on such welding techniques also often have to design according to much more rigid standards. This may include incorporation of thicker materials in order to reduce the stress range at the weld connection. As can be appreciated however, utilizing one or more post-processing techniques and/or incorporating thicker materials to improve weld performance can substantially influence the cost of welding in general and the overall assembly process in particular.

SUMMARY OF THE INVENTION

The following presents a simplified summary of the invention in order to provide a basic understanding of some aspects of the present invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and method to facilitate fillet weld performance. This is achieved by analyzing and controlling a plurality of factors that individually, collectively and/or combinations thereof increase the fatigue life strength and quality of the weld and mitigate weld post processing. Thus, manufacturers can reduce the thickness of load-carrying members, and/or increase weld fatigue life of existing members and design to less conservative standards thereby reducing costs in welding operations. One such factor is to determine and control one or more welding parameters that influence the fillet weld process. These parameters can include wire feed speed, travel speed, and part angles in the deployment of the weld, for example. Another factor is to control the surface conditions of the members to be joined such as controlling the smoothness of the respective surfaces. Yet another factor includes determining the effects of various weld alloys and selecting alloy combinations that yield improved weld performance while mitigating the need to further process the weld such as removing toe intrusions and notches from the weld. Another important factor relates to controlling shielding gas mixtures to improve both horizontal and angled welding operations.

In accordance with the present invention, weld processing factors are determined and affects associated therewith are analyzed. Weld geometries are then profiled and optimized to facilitate improved performance. This includes minimizing weld toe intrusions and post processing, for example. One or more welding variables such as wire and travel speed are determined and controlled. Weld member surface conditions can be controlled via basted plate and/or blasted strip techniques, for example. Wire alloy processing is controlled to include a process, wherein sulfur content along with other elements are maintained in a defined range to improve weld performance. Shielding gas components such as oxygen, argon, helium and carbon dioxide are also controlled in one or more combinations to similarly improve the weld. Improvements can be realized in the resultant geometry of the fillet weld by utilizing one or more of the processes described above and/or combinations thereof. These improvements can include increasing the toe angles and radius associated with the weld while maintaining weld throat and penetration depth dimensions. By controlling these dimensions, fatigue life of the weld can be substantially improved while maintaining strength in addition to mitigating the need to further process the weld thereby reducing costs in the overall design, welding and assembly process.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 7 is a diagram illustrating exemplary wire alloys in accordance with an aspect of the present invention.

DETAILED DESCRIPTION OF THE INVENTION

The present invention relates to a system and methodology providing welding controls and materials, wherein welding processes parameters and materials are analyzed and controlled to improve the fatigue strength and post processing requirements associated with fillet welds. Generally, non-load carrying structural members are joined as attachments to main structural members via the fillet welds, wherein the present invention promotes geometrical improvements between the weld and the members. This is achieved via increases in weld toe dimensions as well as in penetration depth of the weld into the members. In addition to geometrical benefits that promote fatigue strength, post processing of the fillet weld is mitigated since the present invention utilizes materials and processes that facilitate smooth and consistent flow of weld material in and about the member portions to be joined. In this manner, weld toe intrusions and/or other discontinuities in the fillet weld are minimized, thus reducing the need to post process the weld.

Figure 1:
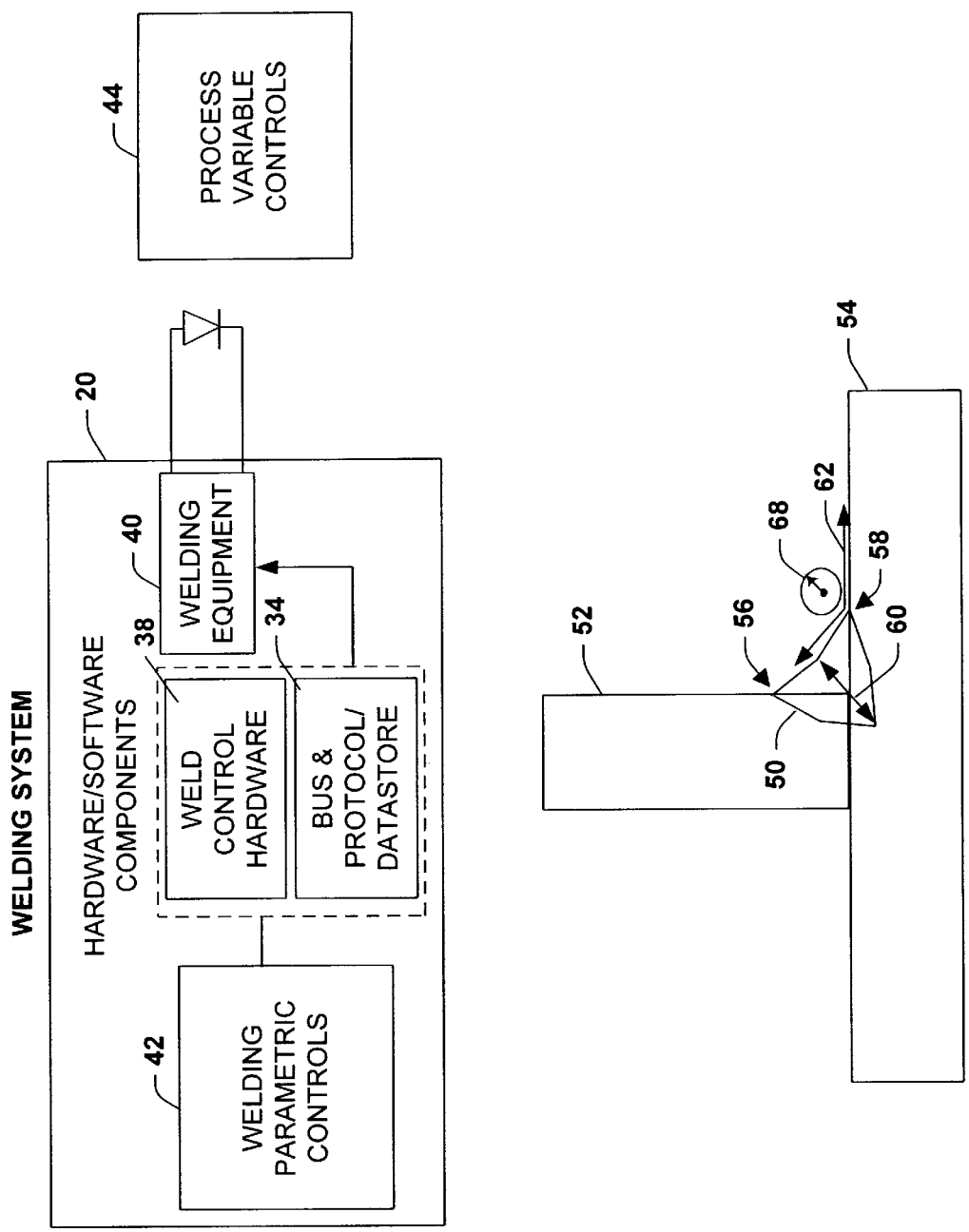
FIG. 1 is a schematic block diagram illustrating a welding system and exemplary weld in accordance with an aspect of the present invention.

Referring initially to FIG. 1, a welding system 20 and exemplary fillet weld 50 are illustrated in accordance with an aspect of the present invention. The welding system 20 can include a local bus and associated data store 34 communicating with weld control hardware 38 that controls associated welding equipment 40, wherein the welding equipment 40 is the physical hardware producing the weld such as a wire feeder, contact tip and associated conditioner, gas mixer, anti-spatter injection system, gas controller, clamp actuator, travel carriage/part manipulator, robot arm/beam/torch manipulator, seam tracker, other input/output devices and welding power source (not shown). The weld control hardware 38 may include a weld controller (not shown), an arc/weld monitor (not shown), and weld I/O and communications interface (not shown) to control the welding equipment 40.

In accordance with the present invention, the welding system 20 includes control hardware and/or software to provide one or more welding parametric controls 42. This can include aspects such as controlling weld part angles, wherein parts can be welded in a substantially horizontal position and/or rotated/positioned (e.g., robotic translation) to provide welds in a downward/non-horizontal angle, for example. Other parametric controls 42 that define a relationship between wire location to a seam include controlling parameters such as wire feed speed, wire travel speed, arc voltage, torch angle, contact tip to work distance and welding gas controls, for example. In accordance with another aspect of the present invention, one or more process variables 44 are controlled to provide a fillet weld. These variables 44 can include controlling surface conditions of one or more structural members to be joined, controlling one or more components of filler metal alloy material, and/or controlling one or more components of gas mixture utilized for weld shielding. By controlling one or more of the welding parameters 42 and/or process variables 44, the present invention facilitates an improved fillet weld in terms of weld strength and mitigation of post processing requirements. As an example, many conventional systems provide a weld toe radius of about one millimeter or less. By combining one or more of the parameter or process controls that are described in more detail below, the present invention can provide about nine or ten millimeters of toe radius dimension.

An exemplary fillet weld 50 is illustrated in FIG. 1 joining structural members 52 and 54 in accordance with the present invention. As illustrated, the fillet weld 50 provides a substantially smooth surface across the fillet weld 50 and provides a substantially smooth interface depicted at points 56 and 58. By providing smooth surfaces and interfaces, weld post processing is mitigated as well as increasing the fatigue life of the weld since failures often occur near imperfections in a weld. An effective throat dimension 60 is provided that indicates the amount of member penetration along with a theoretical throat provided by the fillet weld 50. By increasing the penetration depth as will be described in more detail below, weld strength is also facilitated. Other fillet weld geometric parameters include a weld toe angle depicted at 62 and a toe radius depicted at 68. Weld strength can also be improved by increasing the toe angle 62 and associated radius 68 as will be described in more detail below.

Figure 2:
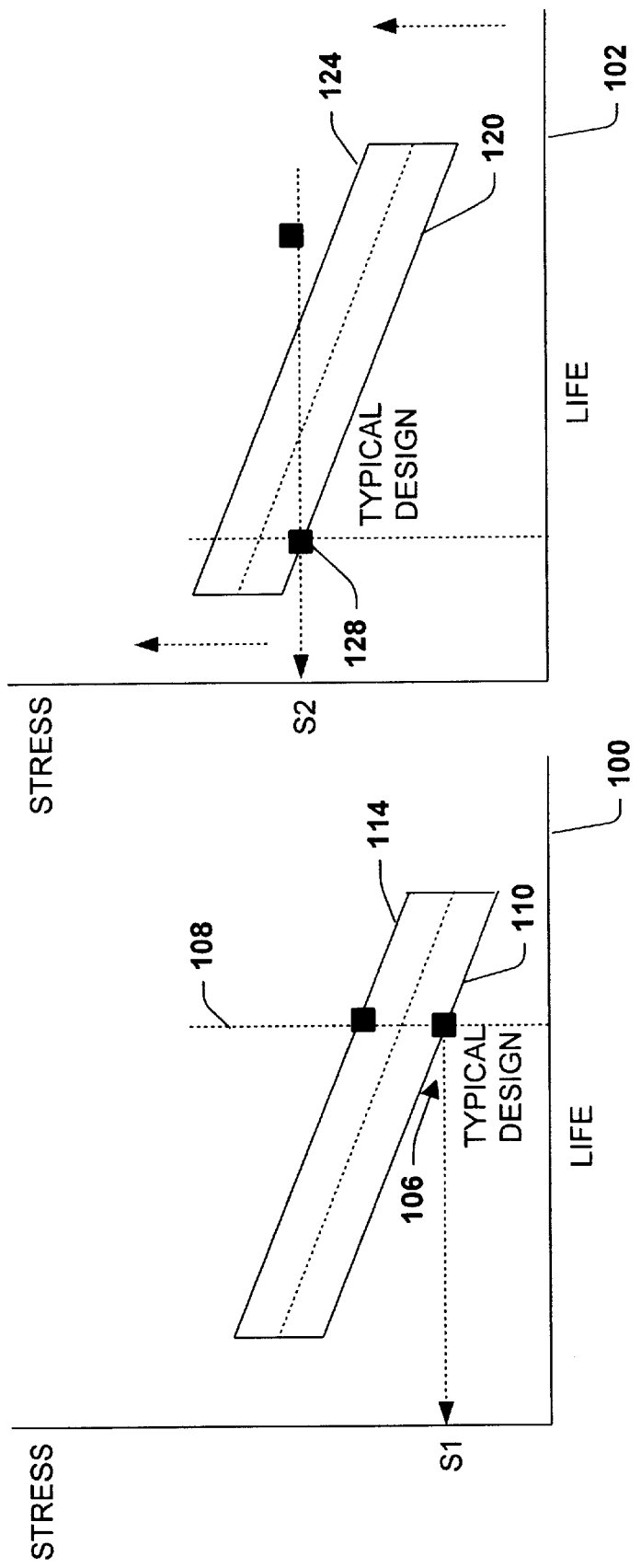
FIG. 2 is a diagram illustrating increased fatigue life in accordance with an aspect of the present invention.

Referring now to FIG. 2, stress/life performance curves 100 and 102 illustrate exemplary design improvements of the fillet weld 50 depicted in FIG. 1. Curves 100 and 102 illustrate the benefits of improving fillet weld fatigue life in accordance with the present invention. For example, point 106 represents a typical load stress versus life design region of a conventional fillet weld. This point 106 resides on an axis 108 of other possible points and intersects on a high confidence line 110 (e.g., 99% confidence). Relative to the high confidence line 110, is a lower confidence line 114 (e.g., 50% confidence) that represents load-bearing stress points that are less conservative and thus increases the chance of weld failures as design load/stress specifications are selected closer to this region. By utilizing the weld process and variable controls that are described in more detail below, it is possible to shift the design operating characteristics such as the high and low confidence lines in an upward manner as depicted in curve 102 and illustrated at lines 120 and 124. Therefore, a design can be selected at point 128 that represents a high confidence that the fillet weld 50 can facilitate the desired load. Thus, increasing the fillet weld toe angle/radius enables weight reduction in the members to be joined while maintaining similar fatigue life of the weld or increases the operating stress range of existing components. In this manner, substantial cost savings and/or increased product performance are realized over conventional systems and welds.

FIGS. 3, 4, 5, 6, 8 and 9 described below, illustrate a methodology for providing various aspects of a fillet weld in accordance with the present invention. This can be applied in conjunction with Gas Metal Arc Welding (GMAW) systems and Flux Cord Arc Welding (FCAW) systems, for example. While, for purposes of simplicity of explanation, the methodology is shown and described as a series of acts, it is to be understood and appreciated that the present invention is not limited by the number or order of acts, as some acts may, in accordance with the present invention, occur in different orders and/or concurrently with other acts from that shown and described herein. For example, those skilled in the art will understand and appreciate that a methodology could alternatively be represented as a series of interrelated states, such as in a state diagram. Moreover, not all illustrated acts may be required to implement a methodology in accordance with the present invention.

Figure 3:
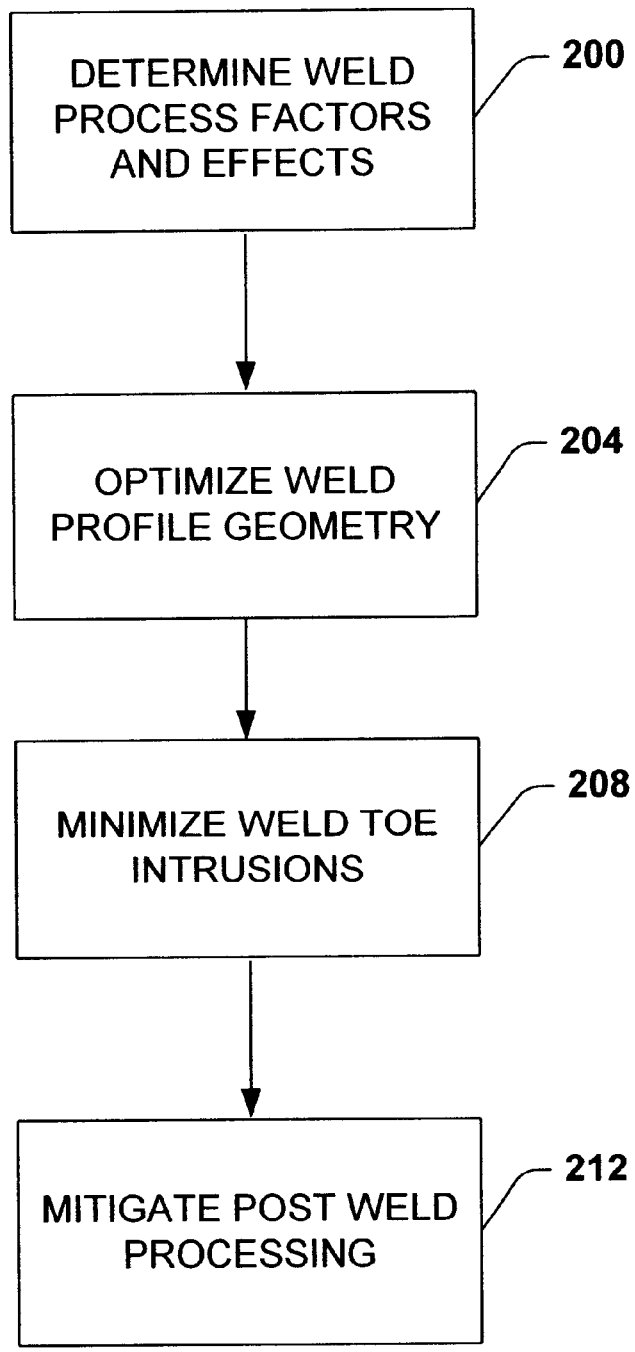
FIG. 3 is a flow diagram illustrating a welding analysis process in accordance with an aspect of the present invention.

Turning now to FIG. 3, a methodology illustrates a welding analysis process in accordance with the present invention. Beginning at 200, weld process factors and associated effects are determined. This can include defining weld parameters, member surface conditions, weld alloy components and shielding gas components, for example, and will be described in more detail below. At 204, weld geometry profiles are optimized. This can include modeling weld geometry parameters such as toe angles, toe radius, sidewall penetration depths and throat dimensions to facilitate weld nugget geometry. At 208, weld toe intrusions are minimized. This includes an analysis and/or testing of the factors described above in order to determine the effects that are most likely to improve weld nugget attributes and minimize effects such as weld toe intrusions and/or other imperfections in the weld. At 212, weld post processing is minimized. This includes analysis and/or testing of the factors described above in order to determine the effects that are most likely to improve the weld surface conditions and/or interface points between the weld and the joined members.

Figure 4:
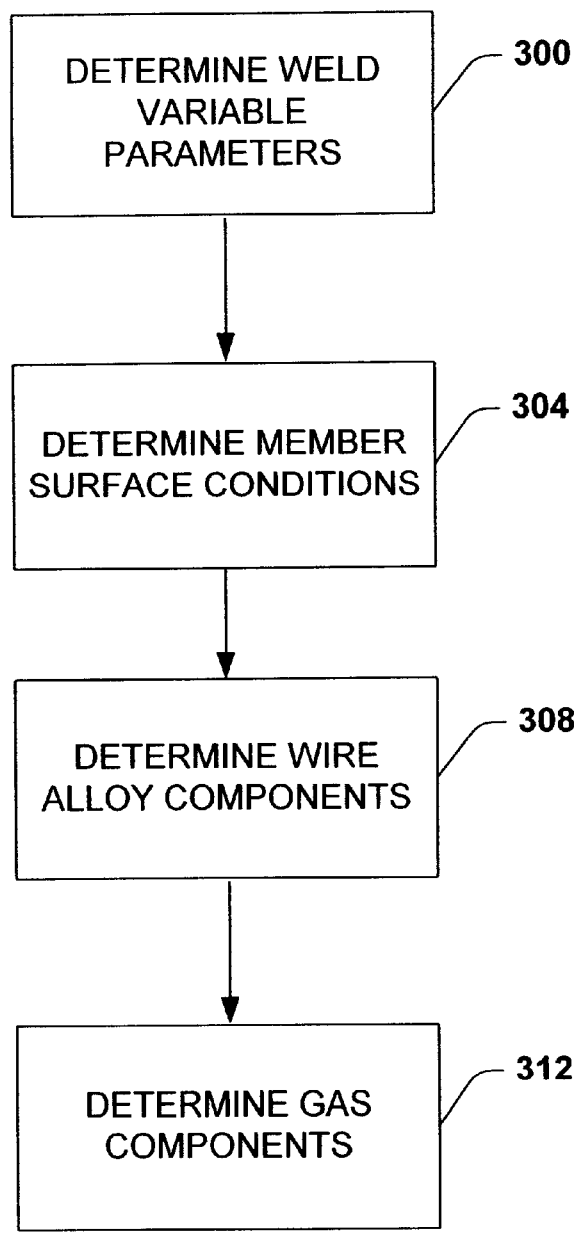
FIG. 4 is a flow diagram illustrating a fillet weld process in accordance with an aspect of the present invention.

Referring now to FIG. 4, a fillet weld process is illustrated in accordance with the present invention. At 300, weld variable parameters are determined. This can include such factors as travel and wire speeds, along with part positioning and/or wire positioning in the joint during the welding process that is described in more detail below. At 304, optimal member weld surface conditions are determined. This can include determining the effects of member surfaces such as having substantially rough or smooth surfaces. At 308, wire alloy components are determined. As will be described in more detail below, this can include observing the effects from various alloy components such as carbon, manganese, silicon, copper and sulfur. At 312, optimal shielding gas components are selected. This can include observing various gases and mixtures thereof that provide an optimal fillet weld. This can include gases such as oxygen, argon, helium, and carbon dioxide.

Figure 5:
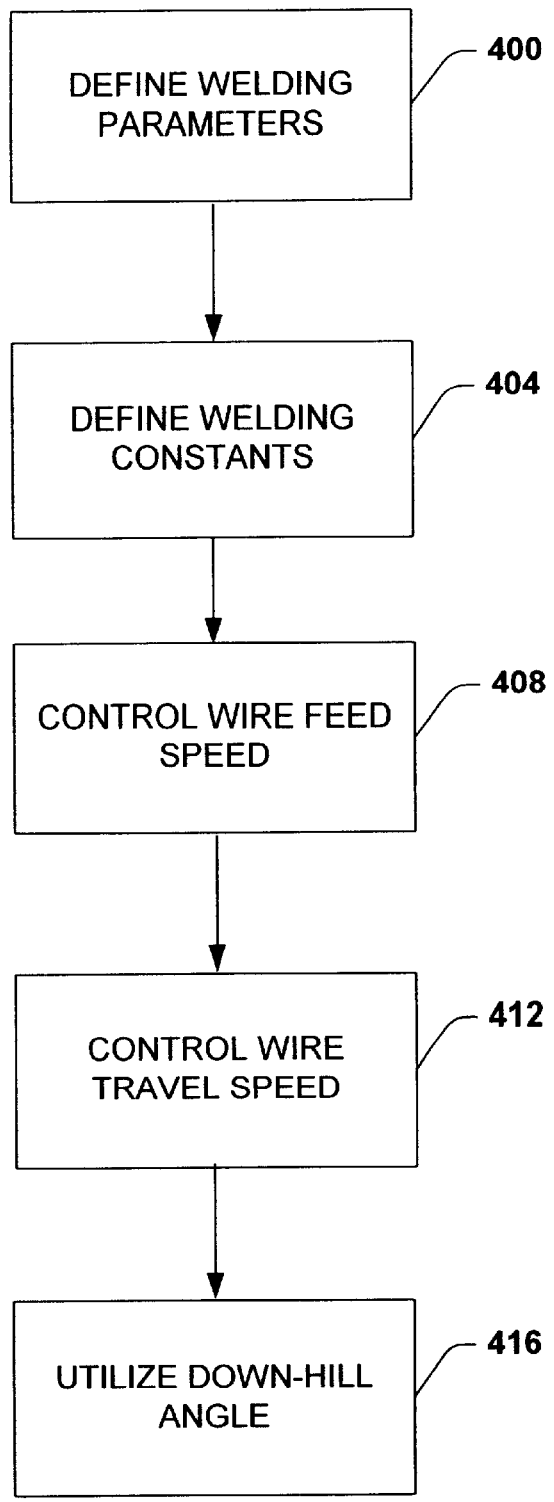
FIG. 5 is a flow diagram illustrating a welding parameter control process in accordance with an aspect of the present invention.

Referring now to FIG. 5, a weld parameter control process is illustrated in accordance with the present invention. At 400, welding parameters are defined. These parameters can include wire feed speed, wire travel speed, arc voltage level, torch angle, contact tip to work distance, wire placement in a joint, and an associated part angle defined for the weld. At 404, welding process constants are defined. This can include utilizing a gas metal arc weld (GMAW) spray transfer, specifying a wire size (e.g., 0.52" diameter), a gas mixture (e.g., Argon 90%, Carbon Dioxide 10%), one or more steel members (e.g., ½" mild steel) and a constant voltage power source output. The act 404 can also include modeling a region of operability over the parameters defined above to determine optimal parameter settings. At 408 and 412, wire feed and travel speed are controlled. These factors contribute concurrently and produce a ratio known as a wire feed speed to travel speed ratio. It has been determined that a ratio of about 40 to 1 with about 0.052" diameter wire produces a substantially optimal setting (e.g., 0.0231 lbs/inch Deposited at about +/−10%) for a $\frac{5}{16}$" fillet weld. At 416, it was determined that a down hill part angle (e.g., less than horizontal to the earth) utilized in the welding process facilitates a smoother fillet weld.

Figure 6:
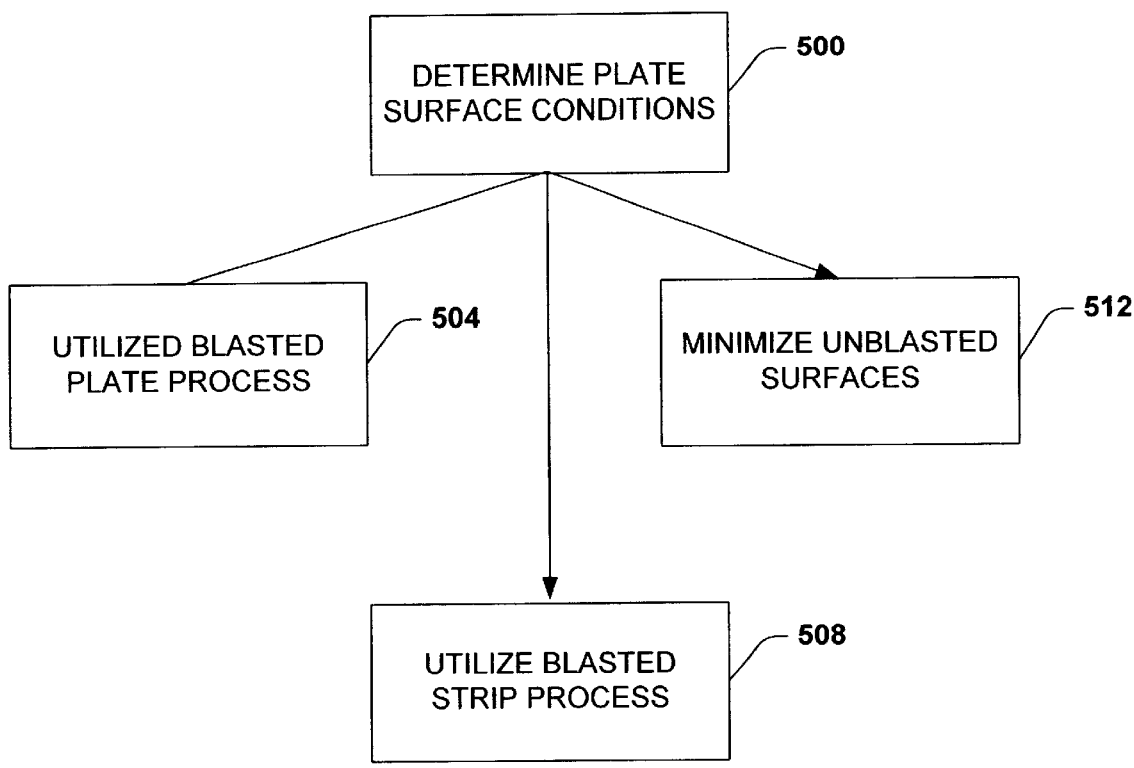
FIG. 6 is a flow diagram illustrating surface condition control process in accordance with an aspect of the present invention.

Referring to FIG. 6, a surface condition control process is illustrated in accordance with the present invention. At 500, a determination is made as to the member surface conditions that provide an improved fillet weld. It was observed at 504 that blasted plate mill plate (e.g., 0.25% Silicon) performs slightly better than basted strip mill plate at 508 (e.g., 0.02% Silicon), wherein the respective plates provided improved fillet welds over oxide bearing surfaces. At 512, it was determined that un-blasted plate material is to be avoided if possible since imperfections such as weld toe intrusions and variations in weld bead geometry may appear.

Turning to FIG. 7, a diagram illustrates exemplary wire alloy specifications in accordance with the present invention. As illustrated, one or more wires may be utilized such as those classified by the American Welding Society (AWS). For example, these wires are designated at 600 as ER70S-3, ER70S-4, ER70S-6, and ER70S-7. At 602, carbon is specified having a range of about 0.06% to about 0.15%. At 604, manganese is specified having a range of about 0.90% to about 2.00%. At 606, silicon is specified as having a range of about 0.45% to about 1.15%. At 608, copper is specified at about 0.5% maximum. These alloys may also include trace amounts of sulfur as described in more detail below.

Figure 8:
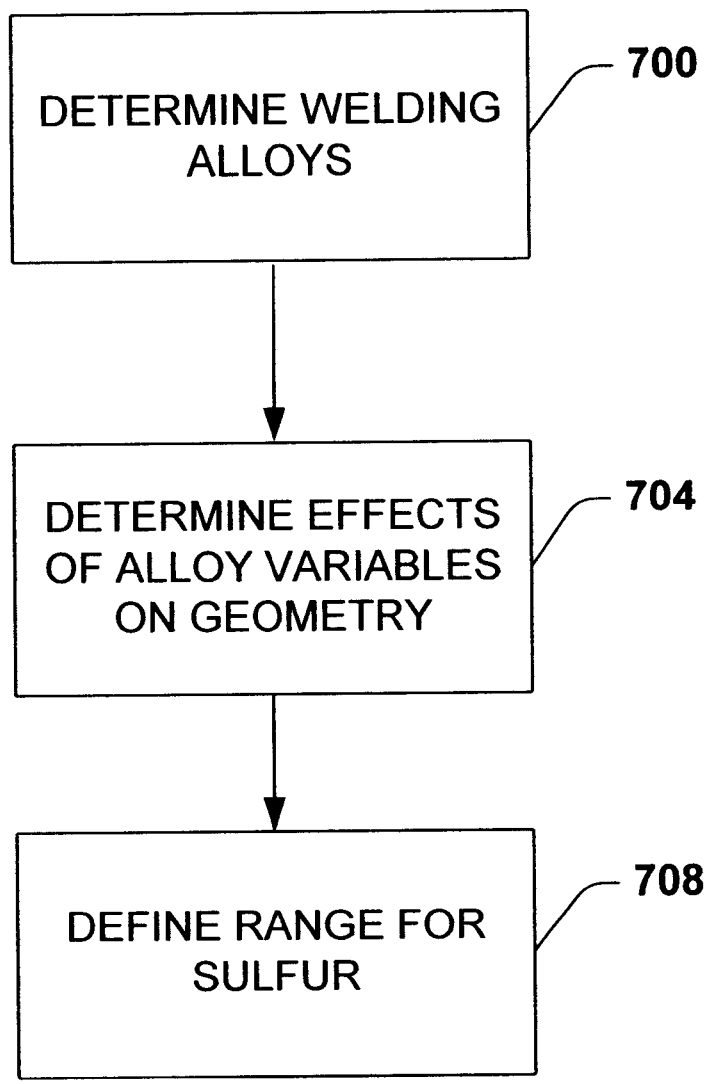
FIG. 8 is a flow diagram illustrating a wire alloy process in accordance with an aspect of the present invention.

Referring now to FIG. 8, a wire alloy control process is illustrated in accordance with the present invention. At 700, a determination is made as to suitable alloy components that are described above in FIG. 7. At 704, alloy components are altered and effects therefrom are observed on the weld geometry. This can also include weld modeling at acts 700 and 704. At 708, it was determined that substantially optimal fillet welds were observed when the element of sulfur was controlled. This range was observed to be about from 0.012% to about 0.025% sulfur, wherein ever more narrowing ranges centering about 0.02% sulfur provided the most suitable fillet weld results.

Figure 9:
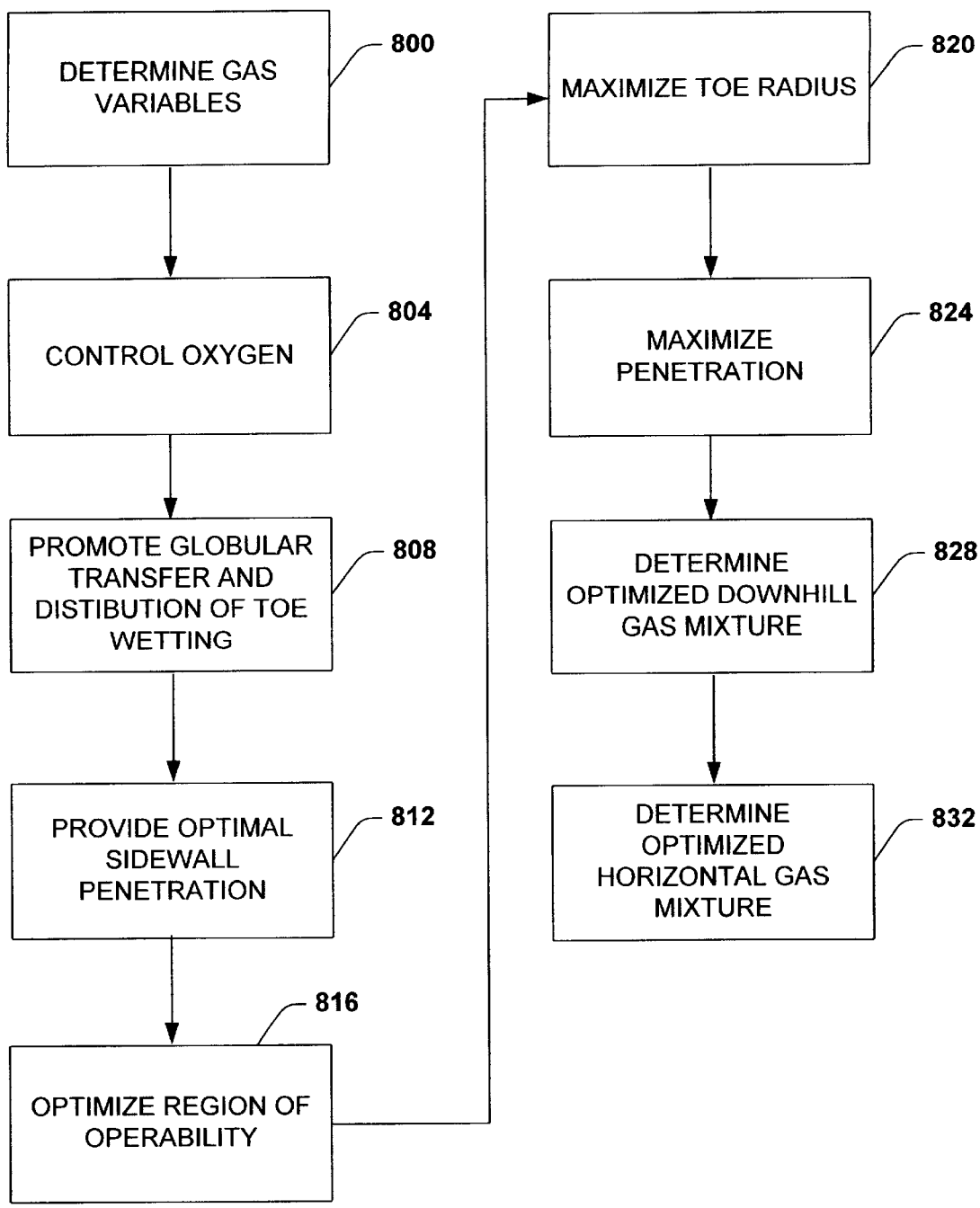
FIG. 9 is a flow diagram illustrating a shielding gas process in accordance with an aspect of the present invention.

Referring now to FIG. 9, a shielding gas process is illustrated in accordance with the present invention. At 800, shielding gas variables are determined for a fillet weld. These variables can include oxygen, argon, carbon dioxide and helium, for example. At 804, the amount of oxygen is controlled to a level of less than about 2%. At 808, a globular weld transfer is utilized that promotes a more even distribution of toe wetting. This can be achieved utilizing helium to alter arc dynamics. At 812, optimal sidewall penetration is provided according to the mixtures described below. At 816, the region of weld operability is optimized. This can be modeled according to various combinations of the above gases. At 820 and 824, weld toe radius and weld penetration depth is maximized. At 828, a determination is made according to an optimal gas mixture for a downward angle weld. It has been determined that a mixture of about 35% helium, 50% argon and about 15% carbon dioxide yields the most suitable results, although it is to be appreciated that these components may be varied about +/−5% and still achieve suitable results. At 832, an optimal flat or horizontal weld (e.g., while members horizontal to the earth) gas component mixture is determined. It has been determined that a mixture of about 50% helium, 35% argon and about 15% carbon dioxide yields the most suitable results for flat welding, although it is to be appreciated that these components may be varied about +/−5% and still achieve suitable results. It is noted that the shielding gas mixtures described above were optimized for the ER70S-3, ER70S-4, ER70S-6, and ER70S-7 wire described above.

What has been described above are various aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A welding system, comprising:
   an arc welding subsystem that provides a fillet weld that joins one or more members; and
   an arc welding controller that controls one or more welding parameters and utilizes one or more controlled process variables, to facilitate geometric control of at least one of a toe angle and a toe radius, while maintaining a throat dimension and/or a penetration depth associated with the joining of the fillet weld and the one or more members.

2. The system of claim 1, the arc welding subsystem being at least one of a Gas Metal Arc Welding (GMAW) and a Flux Cord Metal Arc Welding (FCAW) subsystem.

3. The system of claim 1, wherein the one or more welding parameters include at least one of a wire feed speed, a wire travel speed, an arc voltage level, a torch angle, a contact tip to work distance, and an associated part angle defined for the weld.

4. The system of claim 3, wherein the wire feed speed and the travel speed define a ratio of about 40 to 1 with about 0.052" diameter wire.

5. The system of claim 3, wherein the wire feed speed and the travel speed define a ratio of about 0.023 lbs/inch at about plus and minus 10 percent.

6. The system of claim 3, wherein the fillet weld is joined at a downward angle.

7. The system of claim 1, wherein the one or more controlled process variables includes at least one of a blasted material for the one or more members.

8. The system of claim 7, wherein the blasted material includes at least one of a blasted plate and a blasted strip material.

9. The system of claim 1, wherein the one or more controlled process variables includes a wire alloy having a specified range of carbon of about 0.06 to about 0.15 percent, a specified range of manganese of about 0.90 to about 2.00 percent, a specified range of silicon of about 0.45 to about 1.15 percent, an amount of copper of about 0.5 percent and sulfur specified in the range of about 0.012 to about 0.025 percent.

10. The system of claim 9, wherein the sulfur is further specified in the range of about 0.015 to about 0.022 percent.

11. The system of claim 9, wherein the sulfur is further specified in the range of about 0.019 to about 0.021 percent.

12. The system of claim 1, wherein the one or more controlled process variables includes a gas mixture of helium, argon and carbon dioxide.

13. The system of claim 12, the gas mixture further comprising oxygen that is maintained below about 2 percent.

14. The system of claim 12, the gas mixture specified at about 35 percent helium, 50 percent argon and 15 percent carbon dioxide, the helium, argon, and carbon dioxide providing a range of about plus and minus 5 percent, respectively, to promote downward welding.

15. The system of claim 12, the gas mixture specified at about 50 percent helium, 35 percent argon and 15 percent carbon dioxide, the helium, argon, and carbon dioxide providing a range of about plus and minus 5 percent, respectively, to promote horizontal welding.

16. A welding material, comprising:
   a wire alloy having a specified range of carbon of about 0.06 to about 0.15 percent, a specified range of manganese of greater than 1.40 percent to about 2.00 percent, a specified range of silicon of about 0.45 to about 0.75 percent, and sulfur specified in the range of about 0.012 to about 0.025 percent.

17. The material of claim 16, wherein the silicon is in a specified range of greater than 0.75 percent to about 1.15 percent.

18. The material of claim 16, wherein the sulfur specified in the range of about 0.019 to about 0.021 percent.

19. The welding material of claim 16 employed with a gas mixture specified at about 35 percent helium, 50 percent argon and 15 percent carbon dioxide, the helium, argon, and carbon dioxide providing a range of about plus and minus 5 percent, respectively, to promote a downward welding process.

20. The welding material of claim 19, the gas mixture further comprising oxygen that is maintained below about 2 percent and above 0.1 percent.

21. The welding material of claim 16 employed with a gas mixture specified at about 50 percent helium, 35 percent argon and 15 percent carbon dioxide, the helium, argon, and carbon dioxide providing a range of about plus and minus 5 percent, respectively, to promote a horizontal welding process.

22. The welding material of claim 21, the gas mixture further comprising oxygen that is maintained below about 2 percent and above 0.1 percent.

23. A method to facilitate fillet welding, comprising:
   controlling one or more weld variable parameters associated with a fillet weld;
   controlling weld member surface conditions;
   controlling wire alloy components to facilitate joining of the weld member surfaces; and
   controlling at least one of a toe angle and a toe radius to facilitate fillet weld performance.

24. The method of claim 23, further comprising optimizing weld geometries.

25. The method of claim 23, further comprising at least one of minimizing weld toe intrusions and minimizing post weld processing.

26. The method of claim 23, wherein controlling one or more weld variable parameters includes controlling at least one of a wire feed speed, a wire travel speed, and providing a downward welding angle.

27. The method of claim 26, further comprising utilizing a wire speed to travel speed ratio of about 40 to 1 with about 0.052" diameter wire.

28. The method of claim 23, further comprising blasting to control the weld member surface conditions.

29. The method of claim 23, wherein controlling the one or more wire alloy components includes having a specified range of carbon of about 0.06 to about 0.15 percent, a specified range of manganese of about 0.90 to about 2.00 percent, a specified range of silicon of about 0.45 to about 1.15 percent, an amount of copper of about 0.5 percent and sulfur specified in the range of about 0.012 to about 0.025 percent.

30. The method of claim 29, wherein the sulfur is further specified in the range of about 0.015 to about 0.022 percent.

31. The method of claim 29, wherein the sulfur is further specified in the range of about 0.019 to about 0.021 percent.

32. The method of claim 23, further comprising utilizing a gas mixture of helium, argon and carbon dioxide.

33. The method of claim 32, further comprising specifying the gas mixture at about 35 percent helium, 50 percent argon and 15 percent carbon dioxide, the helium, argon, and carbon dioxide providing a range of about plus and minus 5 percent, respectively, to promote downward welding.

34. The method of claim 32, further comprising specifying the gas mixture at about 50 percent helium, 35 percent argon and 15 percent carbon dioxide, the helium, argon, and carbon dioxide providing a range of about plus and minus 5 percent, respectively, to promote horizontal welding.

35. A method to facilitate fillet welding, comprising:
controlling one or more weld variable parameters associated with a fillet weld;
controlling one or more welding gas mixture components;
controlling wire alloy components to facilitate joining of the weld; and
controlling at least one of a toe angle and a toe radius to facilitate fillet weld performance.

36. The method of claim 35, wherein controlling the one or more wire alloy components includes having a specified range of carbon of about 0.06 to about 0.15 percent, a specified range of manganese of about 0.90 to about 2.00 percent, a specified range of silicon of about 0.45 to about 1.15 percent, an amount of copper of about 0.5 percent and sulfur specified in the range of about 0.012 to about 0.025 percent.

37. The method of claim 35, further comprising utilizing a welding gas mixture of helium, argon and carbon dioxide.

38. The method of claim 37, further comprising specifying the welding gas mixture at about 35 percent helium, 50 percent argon and 15 percent carbon dioxide, the helium, argon, and carbon dioxide providing a range of about plus and minus 5 percent, respectively, to promote downward welding.

39. The method of claim 37, further comprising specifying the gas mixture at about 50 percent helium, 35 percent argon and 15 percent carbon dioxide, the helium, argon, and carbon dioxide providing a range of about plus and minus 5 percent, respectively, to promote horizontal welding.

40. A welding system, comprising:
means for providing a fillet weld that joins one or more members;
means for controlling one or more welding parameters; and
means for controlling one or more process variables to facilitate geometric control of at least one of a toe angle and a toe radius, while maintaining a throat dimension and/or a penetration depth associated with the joining of the fillet weld and the one or more members.

* * * * *